(12) United States Patent
Campbell et al.

(10) Patent No.: US 12,163,283 B2
(45) Date of Patent: Dec. 10, 2024

(54) METHOD AND APPARATUS FOR TREATING LIGNOCELLULOSIC MATERIAL

(71) Applicant: Sustainable Fiber Technologies, LLC, Renton, WA (US)

(72) Inventors: Tyler Campbell, Renton, WA (US); Ed Draper, Renton, WA (US); Mark Lewis, Renton, WA (US)

(73) Assignee: Sustainable Fiber Technologies, LLC, Renton, WA (US)

( * ) Notice: Subject to any disclaimer, the term of this patent is extended or adjusted under 35 U.S.C. 154(b) by 267 days.

(21) Appl. No.: 17/600,094

(22) PCT Filed: Jun. 26, 2020

(86) PCT No.: PCT/US2020/039844
§ 371 (c)(1),
(2) Date: Sep. 29, 2021

(87) PCT Pub. No.: WO2020/264311
PCT Pub. Date: Dec. 30, 2020

(65) Prior Publication Data
US 2022/0195667 A1    Jun. 23, 2022

Related U.S. Application Data

(60) Provisional application No. 62/868,498, filed on Jun. 28, 2019.

(51) Int. Cl.
*D21C 7/06*       (2006.01)
*D21B 1/34*       (2006.01)
*D21C 7/08*       (2006.01)
*D21C 9/10*       (2006.01)

(52) U.S. Cl.
CPC ............... *D21C 7/06* (2013.01); *D21B 1/34* (2013.01); *D21C 7/08* (2013.01); *D21C 9/10* (2013.01)

(58) Field of Classification Search
CPC ............... D21B 1/34; D21C 7/06; D21C 7/08
See application file for complete search history.

(56) References Cited

U.S. PATENT DOCUMENTS 2,592,983 A    4/1952  Von Hilderbrandt
4,154,644 A *  5/1979  Ericsson ............... D21C 9/06
                                                    162/60

FOREIGN PATENT DOCUMENTS

| CN | 1042743   | 6/1990 |
| CN | 1438385   | 8/2003 |
| CN | 102704296 | 6/2014 |
| CN | 208792052 | 4/2019 |

OTHER PUBLICATIONS

International Search Report or and Written Opinion for International Application No. PCT/US2020/039844 mailed on Oct. 22, 2020.

* cited by examiner

*Primary Examiner* — Anthony Calandra
(74) *Attorney, Agent, or Firm* — Emerson, Thomson & Bennett, LLC; Roger D. Emerson; Peter R. Detorre

(57) ABSTRACT

The present disclosure is directed to an apparatus and method for processing lignocellulosic material. The apparatus includes a vessel having a fluid separation plate disposed therein, a fluid circulating system in fluid communication with the vessel and various component parts including nozzles, valves, lines and pumps as needed for discharging processed lignocellulosic materials.

17 Claims, 7 Drawing Sheets

METHOD AND APPARATUS FOR TREATING LIGNOCELLULOSIC MATERIAL

I. BACKGROUND

A. Field

The present disclosure relates to methods and apparatus associated with the processing of lignocellulosic materials.

B. Description of the Related Art

The processing of wood and agriculturally derived lignocellulosic materials to obtain the fibers useful for making paper has traditionally been energy intensive. Chemical treatment of lignocellulosic materials to remove lignin and to whiten the remaining wood fibers is typically accomplished by means of creating large volumes of lignocellulosic material slurries containing the lignocellulosic feed material and one or more chemical fluids or water. These slurries are chemically processed in vats, often under pressure and elevated temperatures and mixing. The slurries are often pumped between vats or through various processing stages, requiring significant pumping power. These processing steps are very energy intensive. First, extensive amounts of fluids to create the slurries and the use of powerful equipment to effectively pump the slurries are required. Also, expensive processing of slurries to separate the fluid from the wood fibers is mandated. Another disadvantage is that it has been shown that the process of pumping and mixing the slurries can harm and diminish the physical properties of the cellulosic fibers.

In view of the ongoing commercial and environmental interests to reduce energy consumption in lignocellulosic material processing, to improve treatment processes in order to better retain the physical and mechanical properties of fibers derived from the lignocellulosic material processing, to limit the overuse of expensive chemicals and water which may need to be recycled or treated before discharge into the environment, and to reduce the costs associated with maintaining and operating processing plants and equipment, there is ongoing motivation to derive new methods of processing lignocellulosic materials and new devices to facilitate the processing of lignocellulosic materials that are directed toward these improvements.

The present disclosure is directed to apparatuses useful in processing lignocellulosic materials and associated methods of lignocellulosic material processing employing such apparatuses, which produce fibers having excellent mechanical and physical properties for use in the production of paper, while reducing the need to create, mix, pump and process large volumes of lignocellulosic slurries. Moreover, the processes and apparatus described herein allow for a reduction in the overall volume of water required to process chemicals which may result in improved chemical effectiveness. The apparatus described herein facilitates the treatment of lignocellulosic materials by means of a circulating fluid system comprising a portion thereof which is driven by the gravity flow of chemical fluids through a volume of lignocellulosic material, recovery of the fluid after it has passed through the lignocellulosic material, recirculation of the fluid, and recovery of the fluid when chemical processing has been completed. Advantages of the methods and apparatus described herein may be represented in improved fluid management, reduction or elimination of slurry mixing and slurry pumping during processing, improved effectiveness of processing chemicals, simpler processing overall and improved retention of fiber properties, reduced water usage, and increased chemical charge reflected as the ratio of active chemicals to mass of bulk material being treated.

BRIEF DESCRIPTION OF THE DRAWINGS

FIG. 3c shows an exterior view of an embodiment of the apparatus in accordance with FIG. 3a.

FIG. 4b shows an exterior view of an embodiment of the apparatus in accordance with FIG. 4a.

FIG. 8b shows an exemplary embodiment of a face plate of the plunger as described in FIG. 8a.

DETAILED DESCRIPTION

Lignocellulosic Material Treatment Apparatus

Figure 1:
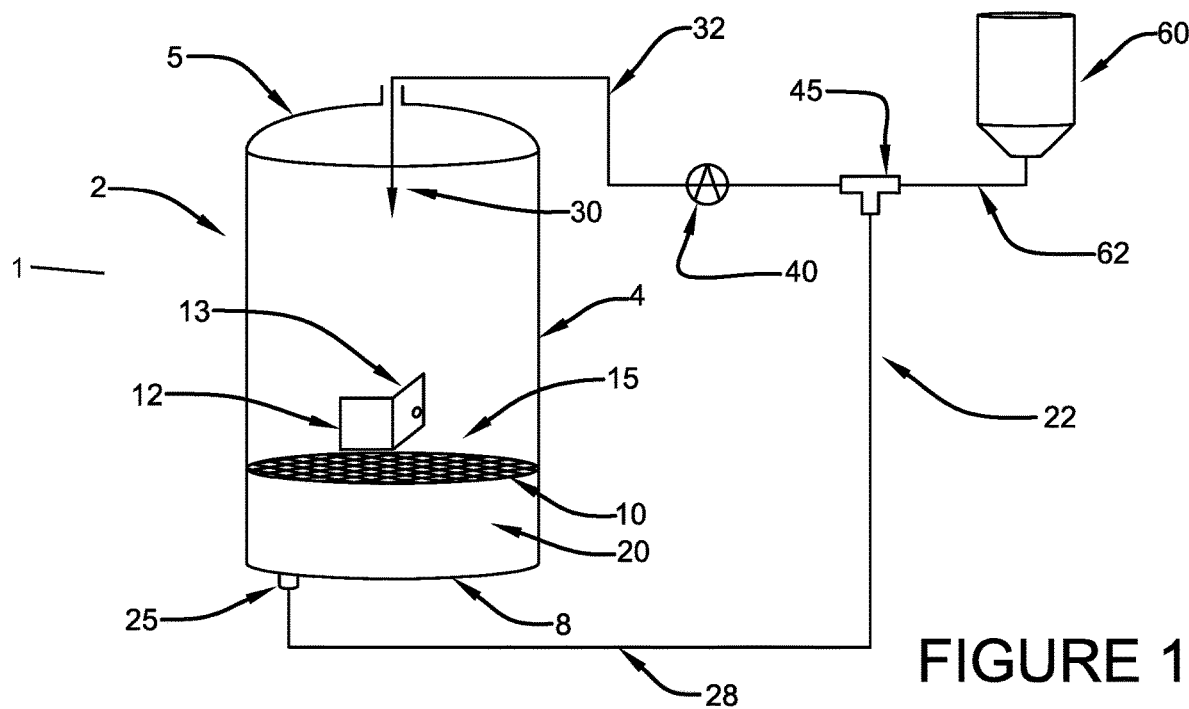
FIG. 1 shows an exemplary embodiment of a lignocellulosic material treatment apparatus according to the present disclosure.

With reference to FIG. 1, a lignocellulosic material (hereinafter "LGC material") treatment apparatus 1 comprises a LGC material treatment vessel 2 (which may hereinafter be referred to as the "vessel") and a fluid circulating system 22 for circulating fluid through the vessel 2 and more specifically, through a mass of LGC material or fibrous LGC material derivatives contained in the vessel 2.

For purposes herein, the term "lignocellulosic material" means and includes fibrous products of lumber and agricultural plants (such as grasses, agricultural crops). LGC material may include untreated, partially treated or fully treated products. Where relevant in the present context, the term "wood fiber" may be used to indicate lignocellulosic material that has been chemically treated to remove lignin, but may or may not be bleached.

Vessel 2 comprises an outer or exterior wall 4, a vessel lid or vessel cover 5 and a vessel floor 8. In certain embodiments, the vessel cover 5 comprises a curtain for containing vapors. The outer wall 4, lid/cover 5 and floor 8 may together form a substantially enclosed containment unit, inside of which associated lignocellulosic material (as defined above) may be treated in accordance with the methods described herein. By "substantially enclosed" one will understand the vessel 2 to be constructed so as to contain the lignocellulosic material or treated lignocellulosic material introduced therein, until such occasion as an operator may wish to remove the material. The vessel 2 may contain one or more ports (as described below) for facilitating access into the interior of the vessel 2, or for the introduction into the interior of the vessel 2 of lignocellulosic material, fluids, sensors, and the like.

Vessel 2 further comprises at least a partially perforated fluid separation plate 10 located between the vessel lid 5 and vessel floor 8. The fluid separator plate 10 is positioned so that, within the vessel, there is a lignocellulosic material containment area 15 above the fluid separator plate 10 and a fluid containment area 20 below the fluid separator plate 10. While the fluid separator plate 10 is described in further detail below, the basic function of the fluid separator plate 10 is to allow associated fluids introduced into the lignocellulosic material to flow through the lignocellulosic material for containment, while retaining the treated lignocellulosic material in the containment area 15.

As noted above, one or more of the outer wall 4 and vessel lid may be provided with an access panel 12 to allow visual or physical access into the interior of the vessel 2. The access panel 12 may be provided with a cover 13 or door to selectively close the access panel 12.

The vessel wall may, in one embodiment, define a cross sectionally round vessel with reference to a plane extending horizontally through the center of the vessel. However, the vessel may be formed in any shape. For example, in other embodiments, the vessel may be cross sectionally oval or quadrilateral.

The internal dimensions of the vessel may be selected with sound engineering judgement. It is understood that the height of the vessel above the distribution plate may depend upon the volume of the material being chemically treated, the selection and number of nozzles, and the spray pattern. Similarly, the volume of the vessel below the fluid input nozzle 30 and below the fluid separator plate 10 may be selected to enhance and collect recovery of the fluid after it has passed through the LGC material. These dimensions may be dependent upon the volume of fluid passing through the material and the rate at which the fluid is recirculated from the bottom of the vessel through the LGC treatment apparatus.

In one embodiment, the vessel wall, lid and/or floor may be insulated or constructed of a material generally recognized to have insulating properties. In some embodiments, the vessel wall may be constructed of stainless steel or aluminum or other metal or metal alloy suitable for the size and application of the vessel. In some embodiments, the vessel wall may be constructed of plastic.

The LGC material treatment apparatus 1, further comprises fluid circulating system 22 in fluid cooperation with the vessel 2. In brief, fluid circulating system 22 facilitates the circulation of associated lignocellulosic material treatment fluids, such as delignifying solutions, bleaching solutions, water and the like, through the vessel 2. As depicted in FIG. 1, the fluid circulating system 22 may comprise a fluid input nozzle 30, adapted to deliver fluid into the lignocellulosic material containment area 15. In one embodiment, the fluid input nozzle 30, may be a spray nozzle. In another embodiment, the fluid input nozzle 30 may be a distribution plate. The fluid introduced through the fluid input nozzle 30, passes through the fluid separator plate 10, into the fluid containment area 20. Fluid discharge valve 25 may be in fluid communication with the fluid containment area 20. Fluid in the fluid containment area 20 may be discharged through fluid discharge valve 25 and into fluid discharge valve line 28, which is in fluid communication with pump 40. Pump 40 may pump fluid from the fluid discharge line 28 into a fluid input nozzle feed line 32 and to fluid input nozzle 30. In this manner, as shown in FIG. 1, associated fluids may be circulated through the vessel 2.

Fluid circulating system 22, may comprise other components in fluid communication with the fluid input nozzle 30 and/or the fluid discharge valve 25. By way of example, the fluid circulating system 22, may comprise one or more fluid containment tanks 60 in fluid communication to the input nozzle 30 or discharge valve 25 by one or more fluid containment tank lines 62. In one embodiment, fluid containment tank 60 may contain the "clean" fluid, which is to be flushed into the vessel 2. In such an embodiment, the fluid containment tank 60 may be in fluid communication with the input nozzle 30. In another embodiment, a fluid containment tank 60 may be in fluid communication with the discharge valve 25 so as to contain the "used" fluid, such as a black liquor, after the LGC material processing has been completed. It will be understood that one or more fluid containment tanks 60 may be in communication with the fluid circulating system 22.

As further shown in FIG. 1, the fluid circulating system 22, may comprise one or more control valves 45 adapted to selectively direct the flow of fluid through the system 22. These valves are known to those of skill in the art and are not further described herein.

Having described an embodiment of the apparatus 1, a method of treating LGC material in accordance with the present disclosure may now be described. In one embodiment, LGC material to be processed may be loaded into the LGC material containment area 15 of the vessel 2. The presence of a perforated fluid separator plate 10 prevents the LGC material from passing into the fluid containment area 20 of the vessel 2. It will of course be understood that de minimis quantities of the LGC material may pass through the perforations of the separator plate 10. However, the separator plate 10 will most usefully have perforations of a size to allow fluids, including, without limitation, liquors, to pass through the separator plate 10 while retaining LGC material and treated LGC material residues in the LGC material containment area 15.

The LGC material may be pre-treated before entering the vessel 2, however, in some embodiments, the LGC material may be untreated (other than by physical separation based on particle size). One or more associated LGC material treating fluids may be introduced onto the LGC material, such as by means of the fluid input nozzle 30. In other embodiments, fluids may be introduced into the LGC material containment area by bulk supply, such as by means of a bucket. As noted above, LGC material treating fluids may include delignifying chemical compositions, bleaching agents or other fluids used in treatment of LGC material or wood fiber. According to one method of the present disclosure, the LGC material treating fluid passes through the LGC material by gravity feed, then through the fluid separator plate into the fluid containment area where it may be stored or discharged through the fluid discharge valve into a fluid containment tank or pumped back to the fluid input nozzle. While the fluid is passing through the LGC material, the LGC material is being treated by it as desired. In one embodiment, the fluid may be a chemical fluid to separate lignin from wood fiber. The selected chemical fluid passes through the LGC material, dissolving the lignin and the lignin/chemical solution passes through the separator plate while leaving the wood fiber in the LGC material containment area. In another embodiment, the fluid may comprise a bleaching solution.

While it is desirable to allow the fluids to pass through the LGC material by gravity, it will be understood that a vacuum could be placed in line of the discharge valve to aid in drawing the fluid through the LGC material, provided the vessel was otherwise air tight.

It is contemplated that a chemical fluid may be circulated through the LGC material, by selective operation of the fluid circulating system, repeatedly until proper chemical treatment of the LGC material has been obtained or until the fluid ceases to have operative effect. One benefit of the present system is that the flow of fluid through the LGC material can be controlled. For example, the flow of fluid can be controlled to vary the amount of fluid by introducing greater or lesser quantities of fluid entering into the system. The flow of fluid can also be controlled to vary the duration of the treatment process by varying the velocity of the fluid entering into the system. The timing or intervals between each treatment can also be controlled as well as the number of treatments applied to the LGC material. Furthermore, samples of the fluid may be drawn from the fluid circulating system at various access points (not shown) to test physical and chemical properties such as temperature, viscosity and the like. Fluid properties may then be adjusted accordingly.

In some embodiments of the present disclosure, the vessel 2 may be fitted with inputs to allow introduction into the vessel of water or steam or heat in order to adjust the environmental characteristics (temperature, humidity, etc.) inside the vessel. It will also be understood that various devices (temperature sensors, humidity sensors, etc.) may be employed to measure the environment inside the vessel.

In some embodiments of the present disclosure, the vessel 2 may be fitted with one or more devices, described in greater detail below, to facilitate feeding LGC material into the LGC material containment area 15 and/or discharging treated LGC material from the LGC material containment area 15. In some embodiments, described in further detail below, the feed device may incorporate all or a portion of the perforated fluid separator plate.

Figure 2:
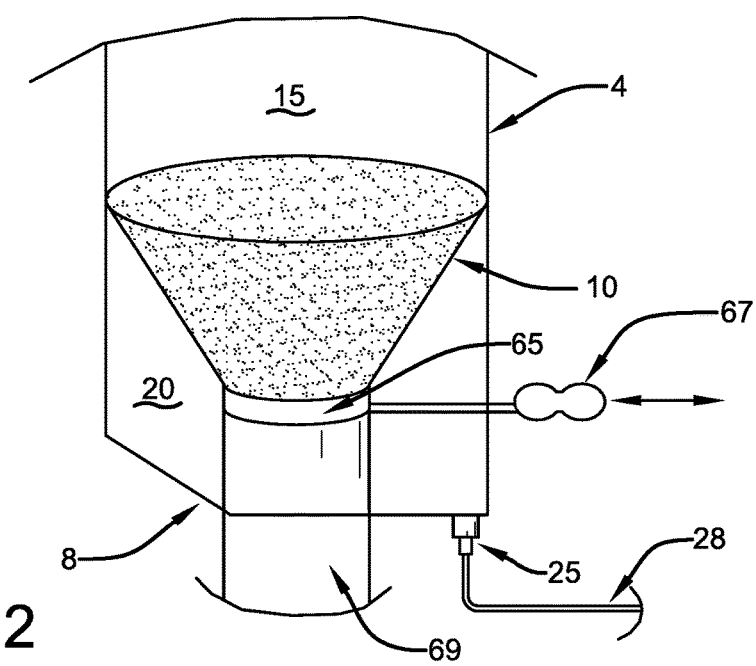
FIG. 2 shows an exemplary embodiment of the apparatus for separating liquids and fibrous solids and discharging solids from a reaction vessel.

With reference now to FIG. 2, one embodiment of a LGC material discharge mechanism is shown comprising a discharge chute 69 extending from the bottom of the perforated fluid separator plate 10, depicted for purposes of FIG. 2 as a conical plate, and exiting the vessel wall 4 or floor 8. A discharge chute isolation door 65 may be located in line of the discharge chute 69 for allowing LGC material to exit the vessel 2 and a fluid discharge valve 25 and fluid discharge valve line 28 may be located in line with the separator plate 10 allowing for fluid to flow to either the fluid containment tank 60 or through the system back to the lignocellulosic material treatment vessel 2.

With continued reference to FIG. 2, chute isolation door 65 may be operative between a first closed position, wherein LGC material and treated LGC material located in the LGC material containment area is not able to pass into the discharge chute 69, and a second open position, where the LGC material and treated LGC material is able to pass through an opening in the fluid separator plate 10 and into the discharge chute 69. The chute isolation door 65 may be operated between the first closed and second open positions by any number of means selected with sound engineering judgment. As shown in FIG. 2, in one embodiment, chute isolation door 65 may be operatively connected to a control 67 which can be pushed or pulled to close and open the chute isolation door 65. However, the chute isolation door 65 could be electronically or hydraulically controlled to open and close.

With continued reference to FIG. 2, there is depicted one architecture of the perforated fluid separator plate 10, which is designed in a conical manner to direct LGC material through the chute isolation door 65 and into the discharge chute 69. The separation plate may be perforated throughout, or only partially perforated. It will be understood that various architectures may be selected to facilitate the separation of LGC material and fluid in the fluid circulating system. For purposes of FIG. 2, the architecture of the perforated separator plate 10 is not intended to be limiting. In a similar matter, the vessel floor 8 may have an architecture to facilitate fluid concentrating in one or other areas of the fluid containment area 20. Furthermore, while FIG. 2 depicts the discharge chute 69 as exiting vertically through the bottom of the vessel 2, it will be understood that the discharge chute could be inclined toward the wall of the vessel 2 and could discharge elsewhere through the bottom or through the side of the vessel. The embodiment of FIG. 2 demonstrates a manner in which treated LGC material can be discharged from the vessel 2, while maintaining the integrity of the perforated fluid separator plate 10 to separate the LGC material from the containment area 15 and the fluid containment area 20 while allowing the flow of fluid through the fluid circulating system 22 according to the methods described above.

Figure 3A:
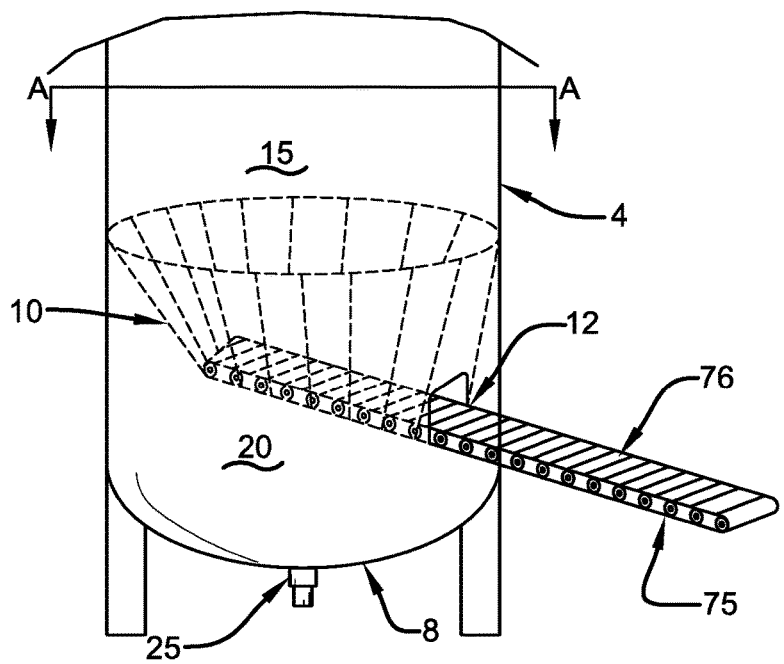
FIG. 3a shows an exemplary embodiment of the apparatus for separating liquids and fibrous solids and discharging solids from the reaction vessel by a conveyor mechanism.
Figure 3B:
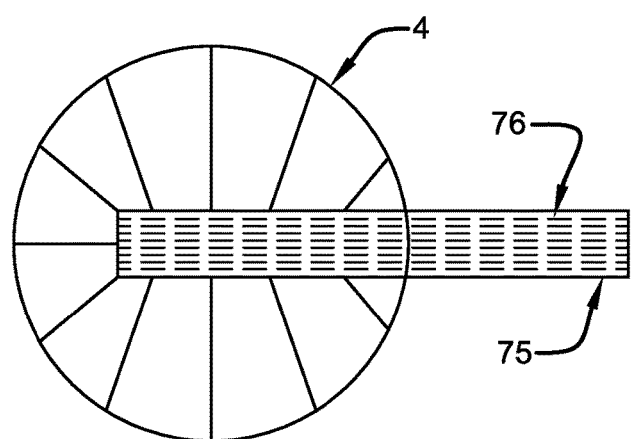
FIG. 3b shows a cross sectional view of the apparatus of FIG. 3a through line AA.

With reference now to FIGS. 3a and 3b, an embodiment of the vessel 2 comprises a LGC material conveyor 75 operatively communicating through the vessel wall 4. LGC material conveyor 75 comprises a power mechanism and drive mechanism (not shown) to selectively drive conveyor belt 76. In one embodiment, conveyor belt 76 may be perforated in whole or in part to allow fluid to pass through the belt 76 into the fluid containment area 15. This is more clearly shown in the conveyor belt 100 of FIG. 9. In this respect, the conveyor belt 76, 100 may alone or in combination with additional perforated architectural elements in the vessel 2 form the perforated fluid separator plate separating the LGC material containment area from the fluid containment area. In FIG. 3a, a separate perforated architecture 10 is depicted as a perforated separator plate in the shape of a cone, referred to as a conical separator plate. However, in another embodiment, this depicted architecture could be unperforated and only the conveyor belt 76 be perforated. In yet another embodiment, the conveyor belt 76 could be wholly or partially un-perforated. It will be understood that an object of the internal architecture of the vessel 2 comprising conveyor 75 is to maintain effective fluid permeable and fiber/LGC material impermeable separation between the LGC material containment area 15 and the fluid containment area 20.

With continuing reference to FIGS. 3a and 3b, at such time as it is desirable to discharge treated LGC material from the vessel 2, conveyor 75 may be started and treated LGC material located in the LGC material containment area 15 may be conveyed on the conveyor belt 76 through a suitable access panel 12 in the vessel wall 4.

Figure 3C:
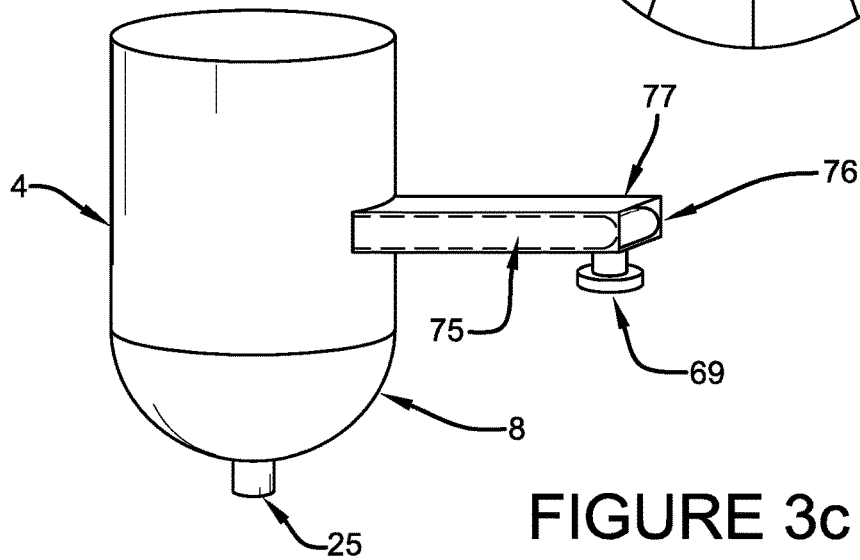

With reference to FIG. 3c, a conveyor shroud 77 may be constructed around the conveyor 75 for protection or to prevent fluid discharge (as discussed in further detail with reference to FIGS. 4a and 4b) or for other reasons relating to the operation of the conveyor 75 outside the vessel 2. The conveyor as shown in FIG. 3c may also include a discharge chute 69 connected or integrated with the shroud allowing LGC material to be removed from the vessel 2.

Figure 4A:
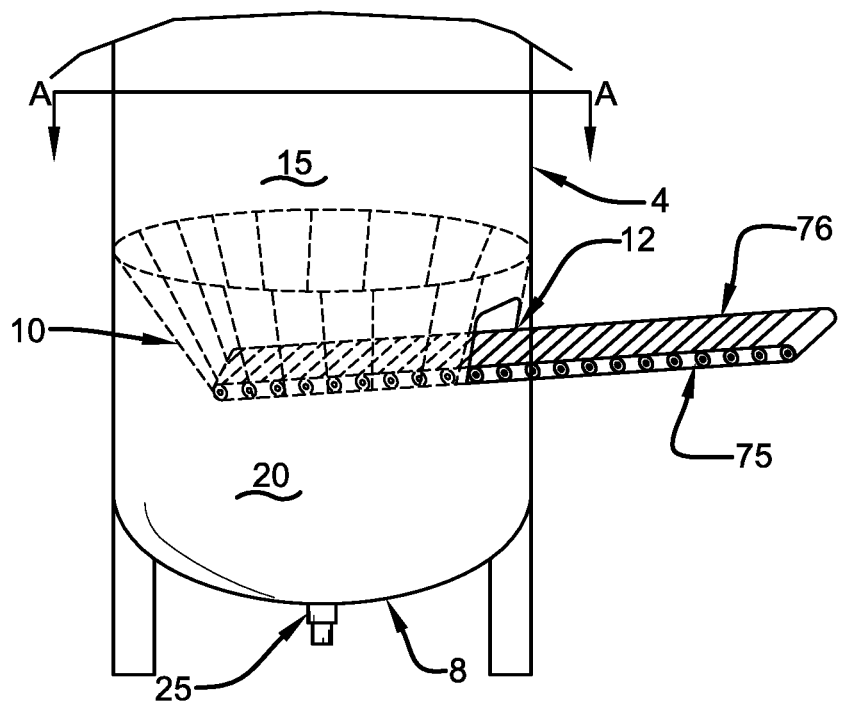
FIG. 4a shows a variation of the embodiment of FIG. 3a wherein the conveyor is inclined.
Figure 4B:
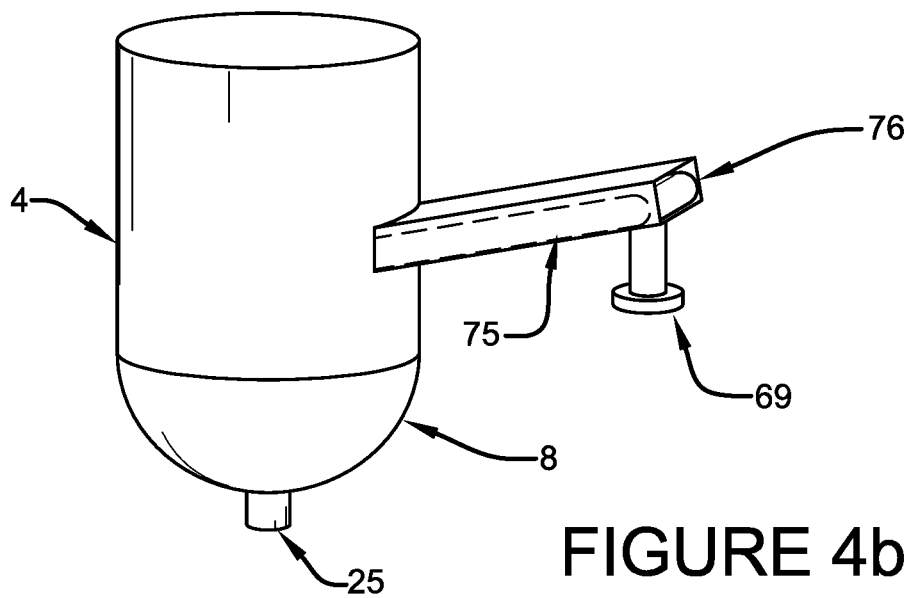

With reference now to FIGS. 4a and 4b, in one embodiment, the conveyor 75 may be installed at an incline relative to the vessel wall 4. Advantageously, by inclining the LGC material conveyor 75 in the manner shown, excess fluid in the discharged LGC material may flow back into the vessel 2 for processing.

Figure 5:
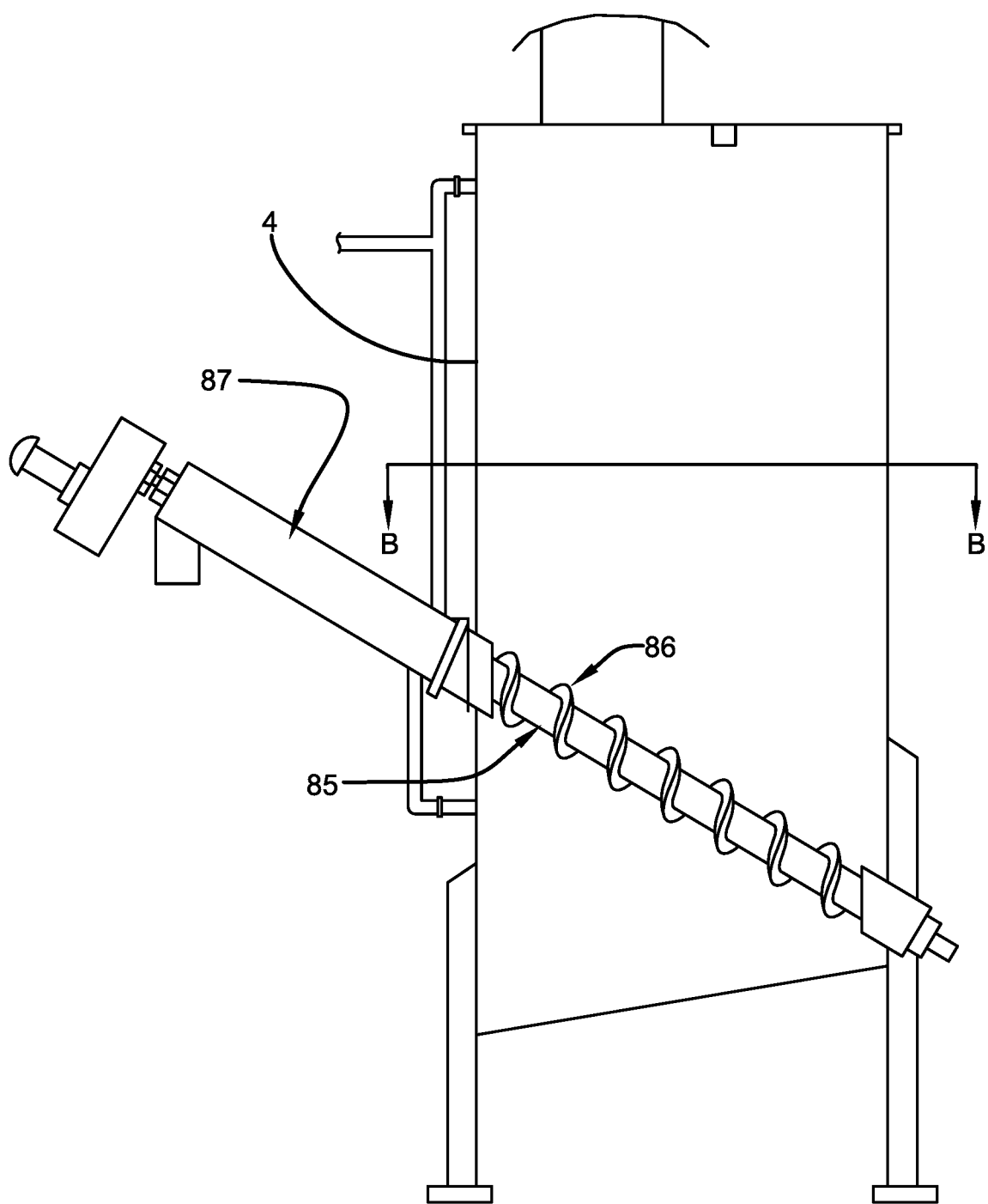
FIG. 5 shows an exemplary embodiment of the apparatus for separating liquids and fibrous solids and discharging solids from the reaction vessel by an auger mechanism.
Figure 6:
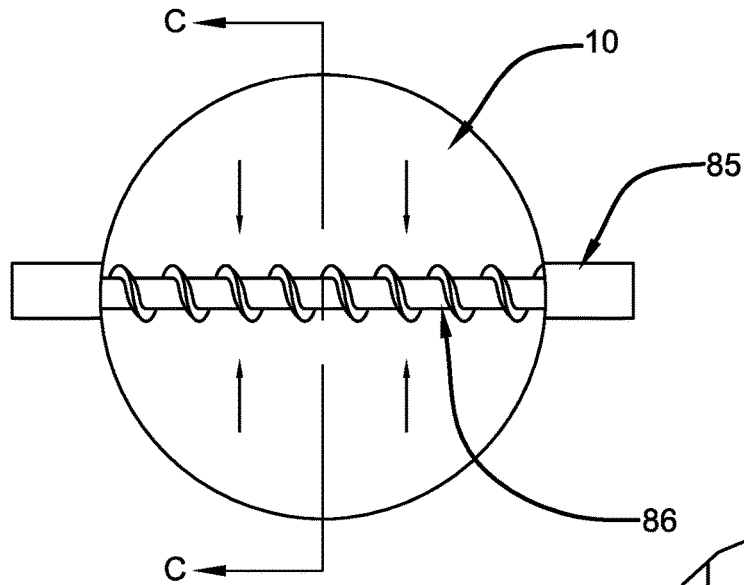
FIG. 6 shows a cross sectional view of the apparatus of FIG. 5 through line BB.
Figure 7A:
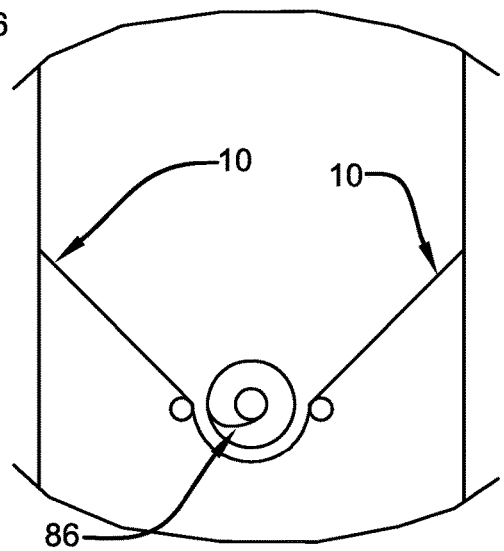
FIG. 7a shows a cross sectional view of the apparatus of FIG. 6 through line CC.

With reference now to FIG. 5, another exemplary embodiment of the vessel 2 includes a LGC material auger 85 operatively communicating through the vessel wall 4. LGC material auger 85 comprises a power mechanism and drive mechanism (not shown) to selectively drive auger blade 86. The architecture of auger blades is well known in the art and is not further described herein. The dimensions of the auger blade 86 may be selected within the sound engineering judgment of a person of ordinary skill in the art. In one embodiment, shown in FIGS. 6 and 7a, a conical fluid separator plate 10 may be adapted to receive the auger blade 86 at its bottom end above the fluid containment area 20.

Figure 7B:
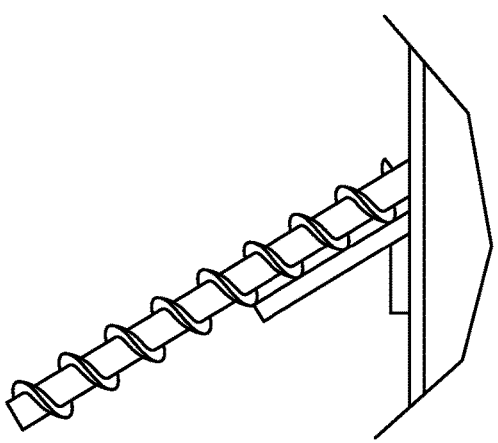
FIG. 7b shows an exemplary embodiment for attachment of a fluid separator plate to the vessel wall.

With reference again to FIG. 5, where the auger blade 86 exits the vessel wall 4, the blade 86 may be encompassed within an auger shroud 87 to protect from injury and to facilitate the movement of LGC material discharged from the vessel. While FIG. 5 depicts the auger blade 86 at an incline relative to the vessel wall 4, it will be understood that in another embodiment, the auger blade 86 may exit horizontally. FIG. 7b illustrates another embodiment where an inclined auger blade 86 does not pass through the vessel wall 4. In another embodiment, it is further contemplated that the auger 85 and auger blade 86 may be positioned above a conveyor 75 as shown for example in FIG. 4a.

With continuing reference to FIG. 5, at such time as it is desirable to discharge treated LGC material from the vessel 2, LGC material auger 85 may be started and treated LGC material located in the LGC material containment area may be augered out of the vessel by operation of the auger blade 86 through a suitable access panel 12 in the vessel wall 4 (for example, as shown in FIG. 1). In certain embodiments, the LGC material in the LGC material containment area may be augured out of the vessel 2 through a discharge chute 69, for example, as shown in FIG. 2. In further embodiments, fluid passing through the LGC material may exit out of the vessel 2 through fluid discharge valve 25 and fluid discharge valve line 28.

Figure 8A:
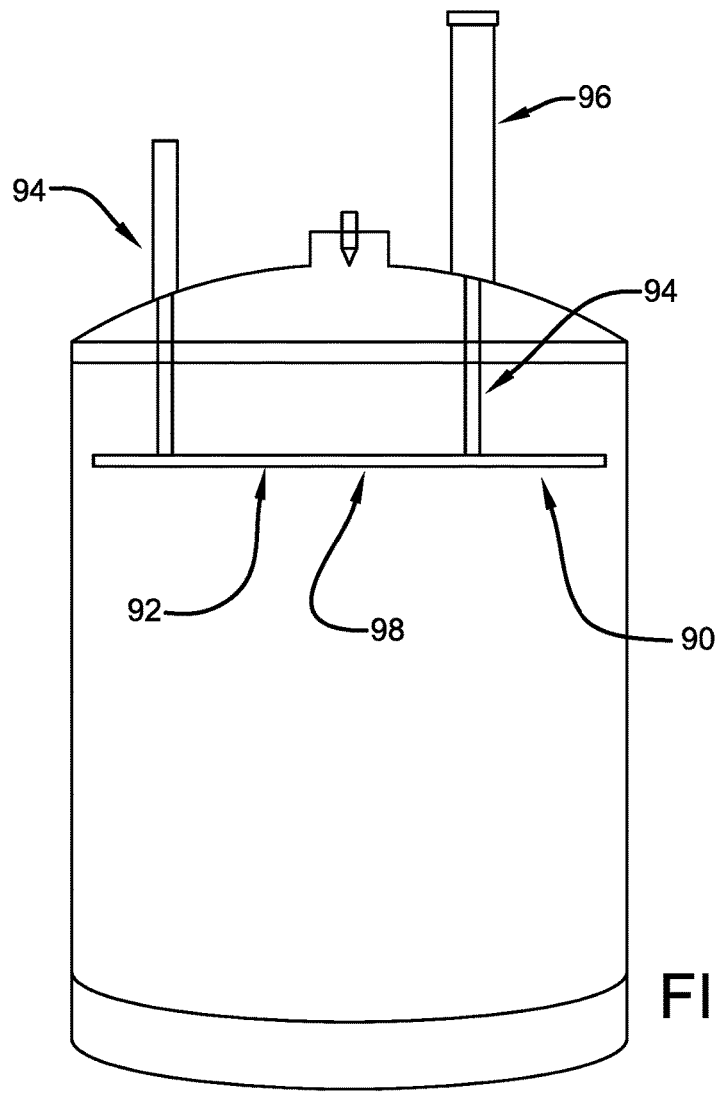
FIG. 8a shows an exemplary embodiment of the apparatus including a plunger to press fluid from a processed lignocellulosic material.
Figure 8B:
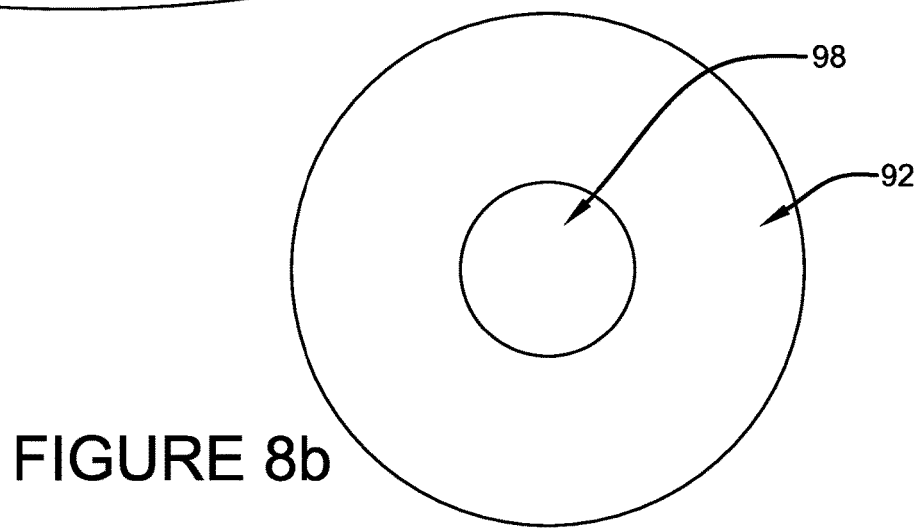

With reference to FIGS. 8a and 8b, in one embodiment, the vessel 2 may comprise a plunger 90 adapted to compress the LGC material against the perforated separator plate 10 in order to facilitate removal of fluid from the LGC material. The plunger 90 may comprise a plunger face plate 92, one or more plunger guide rods 94 operatively attached to the plunger face plate 92, wherein, preferably, at least one plunger guide rod 94 is engaged with a plunger actuator 96 to actuate the plunger 90. Plunger face plate 92 may have one or more fluid access ports 98 to allow fluid to be sprayed into the vessel 2 and to access the LGC material without being precluded by the plunger face plate 92. The fluid access ports 98 may be selectively opened and closed. For example, where the plunger 90 is being operated to press the LGC material, it may be useful for all fluid access ports 98 to be closed.

The architecture of the plunger face plate 92 will usefully be adapted to maximize effectiveness of pressing fluid out of the LGC material. In this respect, where the fluid separator plate 10 is conical, it may be useful for the plunger face plate to also be conical. Alternatively, where the fluid separator plate 10 is flat, a flat plunger face plate 92 may be useful. It will also be understood that the plunger face plate 92 may need to be adapted to avoid damaging an installed LGC material conveyor 75 or LGC material auger 85.

The plunger actuator 96 may be a hydraulic or mechanical actuator. In certain embodiments, the plunger actuator may be a belt-type actuator, a roller-type actuator or any suitable actuator appropriate to drive the plunger face plate. One or more guide holes (not shown) may be provided in the vessel lid 5 to receive the one or more plunger guide rods 94 and to ensure alignment of the plunger face plate 92 in the vessel 2.

Figure 9:
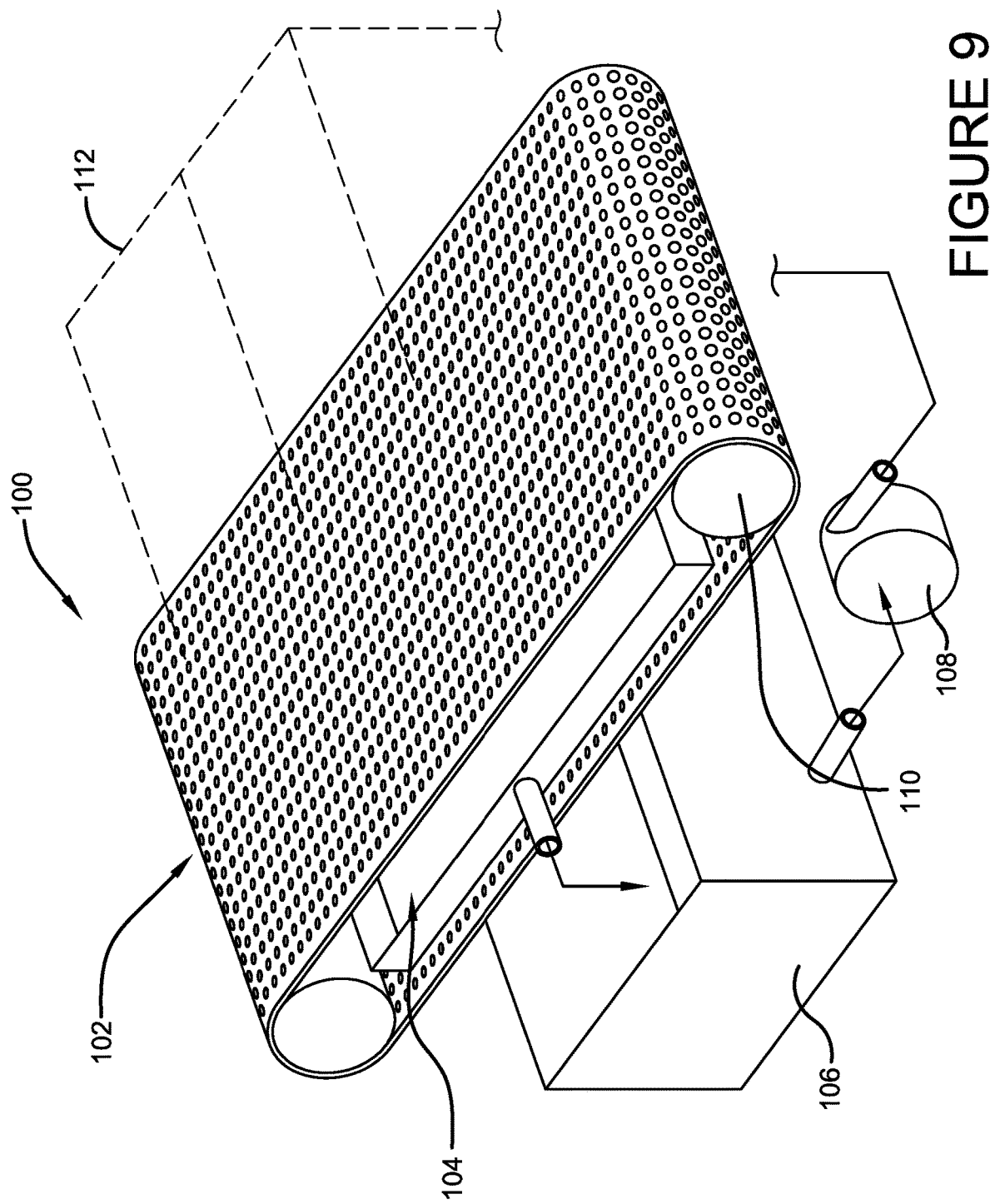
FIG. 9 shows an exemplary embodiment of a continuous belt conveyor iteration of the apparatus

With reference to FIG. 9, the lignocellulosic material treatment vessel 2 may include a conveyor or conveyor system 100 having a perforated conveyor belt 102 wherein the perforations are in the form of appropriately sized holes, slots or apertures within the belt. In an alternative embodiment, the conveyor belt 102 may in the form of perforated conveyor plates (not shown). The conveyor belt 102 may receive feed from a first end of the conveyor belt 102 which enters an access port 12 in a vessel 2. The conveyor belt 102 may also receive feed from a chute (not shown). The conveyor/conveyor system 100 may include a collection trough 104 positioned in between the top and bottom portion of the conveyor (as shown in FIG. 9) or under the bottom portion of the conveyor (not shown). The collection trough 104 receives LGM treated fluid from perforations within the conveyor belt 102. The collection trough 104 includes a conduit which allows the treated fluid to pass into a collection tank 106 positioned under the conveyor belt 102 and collection trough 104. However, the present disclosure also contemplates embodiments which do not include a collection trough wherein the collection tank is positioned directly under the conveyor belt for directly receiving LGM treated fluid directly from the perforations within the conveyor belt. The collection tank 106 includes a first line which leads to a recirculation pump 108 allowing the LGM treated fluid to flow to either the fluid containment tank 60 or through the system back to the lignocellulosic material treatment vessel 2. The conveyor/conveyor system 100 may also be enclosed with a conveyor shroud as further shown in FIG. 9. Thus, the system may be enclosed and may have all other considerations discussed for other iterations. Continuous operation allows multiple zones to introduce different concentrations of chemicals, different flows and different temperatures or separate distinct chemicals altogether.

It is to be understood that the features of the LGC treatment described above with respect to FIGS. 1 through 9 are not described in isolation but rather are selectively combinable in part or in whole to form numerous embodiments and/or variations of the present disclosure.

Having addressed various embodiments of the apparatus, the present disclosure further describes various methods of treating lignocellulosic materials with liquid chemistries to separate the lignin and hemicellulose from the lignocellulosic bulk material. In one embodiment, the process comprises a batch process in which a measure of lignocellulosic bulk material is loaded into the vessel and a volume of liquid comprising the active chemicals is cycled through the batch by spraying and recovery as described above. After the batch has been sufficiently treated, the bulk material may be removed and a fresh batch loaded into the vessel. In another embodiment such as shown in FIGS. 3a-3c, 4a-4b and 9, the process may be a continual process in which bulk material is loaded in one end of the vessel, for example, by a conveyor mechanism which enters the vessel through an entry access panel 12 as shown in FIG. 1, treated by liquid chemicals as the bulk material is conveyed through the vessel and exits the vessel through an exit access panel. In this embodiment, the system may be enclosed and may have all other considerations discussed for other iterations. Continuous operation allows multiple zones to introduce different concentrations of chemicals, different flows and different temperatures or separate distinct chemicals altogether. In still another embodiment, bulk material may be loaded into the vessel from above and the treated material removed from the bottom of the pile in a continuous process. It will be understood that the liquid chemicals may need to be adjusted in the continuous treatment processes in order to maintain an appropriate ratio of chemicals to liquid and of chemicals to bulk mass.

As previously noted, benefits of the apparatus and methods described herein include reduction in the amount of liquid, primarily water, necessary to process the bulk materials. In traditional systems requiring large quantities of water to fluidize the bulk mass, the large amount of water requires a large increase in the amount of active chemicals necessary to provide an appropriate concentration of active chemicals. Moreover, the water must eventually be treated, yielding environmental concerns and expense. Finally, the very mixing process can damage the fibers of the bulk material. In the methods described herein, the liquor combination of liquid and active chemicals is reduced since the bulk material is not fluidized. In being able to use less water, the amount of active chemicals can be adjusted to treat a similar amount of bulk mass. Finally, the fiber quality is advantageously retained as a result of minimized mechanical processing of the bulk materials.

Summary of Reference Numbers for Drawings (FIGS. 1 Through 8b)

| | | | |
|---|---|---|---|
| Lignocellulosic material Treatment Apparatus | 1 | Chute Isolation door | 65 | Plunger | 90 |
| Lignocellulosic material treatment vessel or "vessel" | 2 | Optional Chute Isolation Door Control | 67 | Plunger face plate | 92 |
| Outer or exterior vessel wall | 4 | Discharge Chute | 69 | Plunger rod | 94 |
| Vessel lid | 5 | | | Plunger actuator | 96 |
| Vessel floor | 8 | | | Fluid access port | 98 |
| Perforated fluid separator "plate" | 10 | | | | |
| Access panel | 12 | Lignocellulosic material conveyor | 75 | | |
| Access panel cover | 13 | Conveyor belt | 76 | A | |
| Lignocellulosic material containment area | 15 | Cross Section | | | |
| Fluid containment area | 20 | Conveyor shroud | 77 | Conveyor/Conveyor System | 100 |
| Fluid circulating system | 22 | Conveyor discharge chute | 69 | Conveyor belt | 102 |
| Fluid discharge valve | 25 | | | Collection trough | 104 |
| Fluid discharge valve line | 28 | | | Collection tank | 106 |
| Fluid input nozzle | 30 | Lignocellulosic material auger | 85 | Recirculation pump | 108 |
| Fluid input nozzle feed line | 32 | Auger blade | 86 | Conveyor roller | 110 |
| Pump | 40 | Auger shroud | 87 | Conveyor shroud | 112 |
| Control valve | 45 | | | | |
| Fluid containment tank | 60 | | | | |
| Fluid containment tank line | 62 | | | | |

FIG. 1 - General Overview of Apparatus and Fluid Circulating System
FIG. 2 - "Passive" lignocellulosic material discharge shoot
FIGS. 3a-c and 4a-b - "In-line" and "inclined" conveyor
FIG. 5, 6, 7a and 7b - screw-type discharge
FIGS. 8a and 8b - Vessel with integrated lignocellulosic material press According to Clause 1, an apparatus for processing lignocellulosic material is provided which includes—a vessel comprising an exterior vessel wall, a vessel cover and a vessel floor, a fluid separator plate disposed within the vessel below the vessel cover, above the vessel floor and between the vessel wall, the fluid separator plate having at least one fluid channel through the fluid separator plate allowing fluid to pass from a material containment area above the fluid separator plate into a fluid containment area below the fluid separator plate, a fluid circulating system in fluid communication with the vessel, the fluid circulating system including—a fluid input nozzle positioned on or in the vessel above the fluid separator plate, a fluid input line fluidly connecting a fluid containment tank and the fluid input nozzle, a fluid discharge valve positioned on or in the vessel below the fluid separator plate, a fluid discharge line fluidly connecting the fluid discharge valve and the fluid containment tank, and a pump fluidly connected to the fluid input line and the fluid discharge line.

According to Clause 2, the apparatus of Clause 1 may include an access panel within the vessel allowing for insertion and removal of material into the vessel.

According to Clause 3, the apparatus of Clause 1 or Clause 2 may include a control valve which operates to direct fluid passing through the fluid discharge line to the fluid containment tank or to the fluid input line to the fluid input nozzle and to the vessel.

According to Clause 4, the apparatus of any one of Clauses 1-3 may include a fluid separator plate which is perforated in whole or in part.

According to Clause 5, the apparatus of any one of Clauses 1-4 may include a fluid separator plate which is substantially planar.

According to Clause 6, the apparatus of any one of Clauses 1-5 may include a fluid separator plate which is a moving plate relative to the vessel.

According to Clause 7, the apparatus of any one of Clauses 1-5 may include a fluid separator plate which is stationary relative to the vessel.

According to Clause 8, the apparatus of any one of Clauses 1-7 may include a fluid separator plate which is conical.

According to Clause 9, the apparatus of any one of Clauses 1-8 may include a vessel wall which is cross sectionally substantially round.

According to Clause 10, the apparatus of any one of Clauses 1-8 may include a vessel wall which is vertically planar.

According to Clause 11, the apparatus of any one of Clauses 1-10 may include a fluid separator plate which has an opening adapted to cooperate with a chute, wherein the chute extends from the opening of the fluid separator plate below the fluid separator plate to the exterior of the vessel through one of the vessel wall or floor.

According to Clause 12, the apparatus of any one of Clauses 1-11 may include a chute which has a chute isolation door located in the chute adjacent to an opening in the fluid separator plate, wherein the chute isolation door is selectively operable between an open and a closed position.

According to Clause 13, the apparatus of any one of Clauses 1-12 may include a control which operates to open or close the chute isolation door manually through pushing or pulling the control, electronically or hydraulically.

According to Clause 14, the apparatus of any one of Clauses 1-13 may include a vessel which has a conveyor having a conveyor belt, wherein the conveyor is proximate to the separator plate, wherein the conveyor may be perforated in whole or in part to allow fluid to pass into the fluid containment area.

According to Clause 15, the apparatus of any one of Clauses 1-6 and 9-13 may include a conveyor which serves as a fluid separator plate, providing a porous means of conveyance and limiting the relative motion between the material as it moves through the vessel.

According to Clause 16, the apparatus of Clauses 14 or 15 may include a shroud which encapsulates a conveyor.

According to Clause 17, the apparatus of any one of Clauses 14-16 may include a conveyor which is positioned horizontally with respect to the vessel.

According to Clause 18, the apparatus of any one of Clauses 14-16 may include a conveyor which is positioned at an angle with respect to the vessel.

According to Clause 19, the apparatus of any one of Clauses 14-16 or 18 may include a conveyor which is positioned at an incline with respect to the vessel allowing fluid contained within material exiting the vessel to re-enter the vessel for passage through the fluid separator plate.

According to Clause 20, the apparatus of any one of Clauses 14-19 may include a conveyor discharge chute which allows material to be discharged from the conveyor as it exits the vessel, wherein the discharge chute may be connected to or integral with the shroud or wherein the discharge chute may be engaged with a conveyor not having a shroud.

According to Clause 21, the apparatus of any one of Clauses 1-20, may include a vessel having an auger with an auger blade, wherein the auger is positioned proximate to the separator plate and allows for material in the material containment area to be augered out of the vessel by operation of the auger blade through an access panel in the vessel wall.

According to Clause 22, the apparatus of Clause 21 may include an auger shroud positioned over at least a portion of the auger blade as a protective shield and to facilitate movement of material or fluid back into the vessel.

According to Clause 23, the apparatus of any of Clauses 1-4 and 7-22 may include an auger positioned proximate to a bottom portion of a conical separator plate.

According to Clause 24, the apparatus of any one of Clauses 1-23 may include an auger blade which exits the vessel wall through an access panel within the vessel wall.

According to Clause 25, the apparatus of any one of Clauses 1-24 may include an auger which exits the vessel horizontally with respect to the vessel wall.

According to Clause 26, the apparatus of any one of Clauses 1-24 may include an auger which exits the vessel at an angle with respect to the vessel wall.

According to Clause 27, the apparatus of any one of Clauses 1-24 and 26 may include an auger which exits the vessel at an incline relative to the vessel wall.

According to Clause 28, the apparatus of any one of Clauses 1-23 may include an auger which does not pass through the vessel wall.

According to Clause 29, the apparatus of any one of Clauses 1-28, may include a vessel having a vacuum or a plunger, wherein the plunger is adapted to compress material placed within the material containment area within the vessel.

According to Clause 30, the apparatus of any one of Clauses 1-29 may include a plunger having a plunger face plate.

According to Clause 31, the apparatus of any one of Clauses 1-30 may include a plunger having one or more plunger guide rods operatively attached to the plunger face plate.

According to Clause 32, the apparatus of any one of Clauses 1-32 may include a plunger having at least one plunger guide rod which is engaged with a plunger actuator to actuate the plunger.

According to Clause 33, the apparatus of any one of Clauses 1-33 may include a plunger having a the plunger face plate which has one or more fluid access ports to allow fluid to be sprayed within the vessel.

According to Clause 34, the apparatus of any one of Clauses 1-34 may include a plunger having fluid access ports which may be selectively opened and closed.

According to Clause 35, provided is a method for processing lignocellulosic material. The method includes the following steps—providing a processing apparatus, the processing apparatus including—a vessel comprising an exterior vessel wall, a vessel cover and a vessel floor, a fluid separator plate disposed within the vessel below the vessel cover, above the vessel floor and between the vessel wall, the fluid separator plate having at least one fluid channel through the fluid separator plate allowing fluid to pass from a material containment area above the fluid separator plate into a fluid containment area below the fluid separator plate, a fluid circulating system in fluid communication with the vessel, the fluid circulating system including—a fluid input nozzle positioned on or in the vessel above the fluid separator plate, a fluid input line fluidly connecting a fluid containment tank and the fluid input nozzle, a fluid discharge valve positioned on or in the vessel below the fluid separator plate, a fluid discharge line fluidly connecting the fluid discharge valve and the fluid containment tank, a pump fluidly connected to the fluid input line and the fluid discharge line; providing an amount of lignocellulosic material on the fluid separator plate; discharging a fluid from the fluid containment tank through the fluid input line and the fluid input nozzle onto the lignocellulosic material; draining at least a portion of the fluid through the at least one fluid channel in the fluid separator plate, and discharging the at least a portion of the fluid from the vessel through the fluid discharge valve and the fluid discharge line.

According to Clause 36, the method of Clause 35, includes the step of discharging the at least a portion of the fluid from the vessel to the fluid input nozzle.

According to Clause 37, the method of Clause 35 or 36 includes the step of discharging the at least a portion of the fluid from the vessel to the fluid containment tank.

According to Clause 38, the method of any one of Clauses 35-37 which incorporates the use of a fluid separator plate which is conical and which includes an opening adapted to cooperate with a chute, wherein the chute extends from the opening of the fluid separator plate below the fluid separator plate to the exterior of the vessel through one of the vessel wall or floor, the chute further including a chute isolation door located in the chute adjacent the opening of the fluid separator plate, wherein the chute isolation door is selectively operable between an open position and a closed position, the method further including the step of selectively opening the chute isolation door and discharging the lignocellulosic material through the chute and out of the vessel.

According to Clause 39, the method of any one of Clauses 35-38 wherein the lignocellulosic material is pulled or pushed through the vessel over a stationary fluid separation plate.

According to Clause 40, the method of any one of Clauses 35-38 wherein the lignocellulosic material is pulled through the vessel through application of a vacuum to the vessel.

According to Clause 41, the method of any one of Clauses 35-38 wherein the lignocellulosic material is pushed through the vessel by a plunger of any one of Clauses 29-34.

According to Clause 42, the method of any one of Clauses 35-41, wherein the processing apparatus includes a conveyor which extends through at least one opening in the vessel wall for moving material into and out of the vessel, wherein the conveyor is proximate to the separator plate.

According to Clause 43, the method of any one of Clauses 35-42, wherein the processing apparatus includes at least one or more of the following—i.) a conveyor which extends through at least one opening in the vessel wall for moving lignocellulosic material into and out of the vessel, wherein the conveyor is proximate to the separator plate; ii) a conveyor which serves as the fluid separator plate providing a porous means of conveyance and limiting the relative motion between the lignocellulosic material as it moves through the vessel; iii) an auger having an auger blade, wherein the auger is positioned proximate to the separator plate and allows for material in the material containment area to be augered out of the vessel by operation of the auger blade through an access panel in the vessel wall; and iv) a plunger, wherein the plunger is adapted to compress material placed within the material containment area within the vessel, wherein the plunger includes a plunger face plate, one or more plunger guide rods operatively attached to the plunger face plate, wherein at least one plunger guide rod is engaged with a plunger actuator to actuate the plunger, wherein the plunger face plate has one or more fluid access ports to allow fluid to be sprayed within the vessel and wherein the fluid access ports may be selectively opened and closed.

According to Clause 44, the method of any one of Clauses 35-39 may include components of the apparatus as described in any one of Clauses 1-34.

While the LGC treatment apparatus, associated components and treatment system have been described above in connection with various illustrative embodiments, it is to be understood that other similar embodiments may be used or modifications and additions may be made to the described embodiments for performing the same function disclosed herein without deviating therefrom. Further, all embodiments disclosed are not necessarily in the alternative, as various embodiments may be combined or subtracted to provide the desired characteristics. Variations can be made by one having ordinary skill in the art without departing from the spirit and scope hereof. Therefore, the present disclosure should not be limited to any single embodiment, but rather construed in breadth and scope in accordance with the recitations of the appended claims.

What is claimed is:

1. An apparatus for processing lignocellulosic material comprising:
    a vessel comprising an exterior vessel wall, a vessel cover, and a vessel floor,
    a fluid separator plate disposed within the vessel below the vessel cover, above the vessel floor and between the vessel wall, the fluid separator plate having at least one fluid channel through the fluid separator plate allowing fluid to pass from a material containment area above the fluid separator plate into a fluid containment area below the fluid separator plate,
    a conveyor having a conveyor belt, wherein the conveyor is proximate to the fluid separator plate, wherein the conveyor is perforated in whole or in part to allow fluid to pass into the fluid containment area,
    a fluid circulating system in fluid communication with the vessel, the fluid circulating system comprising—
        a fluid input nozzle positioned on or in the vessel above the fluid separator plate,
        a fluid input line fluidly connecting a fluid containment tank and the fluid input nozzle,
        a fluid discharge valve positioned on or in the vessel below the fluid separator plate,
        a fluid discharge line fluidly connecting the fluid discharge valve and the fluid containment tank, and
        a pump fluidly connected to the fluid input line and the fluid discharge line.

2. The apparatus of claim 1, wherein the fluid separator plate is perforated in whole or in part.

3. The apparatus of claim 1, wherein the fluid separator plate is substantially planar.

4. The apparatus of claim 1, wherein the fluid separator plate comprises a moving plate relative to the vessel.

5. The apparatus of claim 1, wherein the fluid separator plate is stationary relative to the vessel.

6. The apparatus of claim 1, wherein the fluid separator plate is conical.

7. The apparatus of claim 1, wherein the vessel wall is cross sectionally substantially round.

8. The apparatus of claim 1, wherein the vessel wall is vertically planar.

9. The apparatus of claim 1, wherein the vessel further comprises an auger having an auger blade, wherein the auger is positioned above the conveyor proximate to the separator plate.

10. The apparatus of claim 1, wherein the vessel further comprises a plunger, wherein the plunger is adapted to compress material placed within the material containment area within the vessel.

11. A method for processing lignocellulosic material using the apparatus of claim 1 comprising:
    providing an amount of lignocellulosic material on the fluid separator plate,
    discharging a fluid from the fluid containment tank through the fluid input line and the fluid input nozzle onto the lignocellulosic material,
    passing at least a portion of the fluid through the at least one fluid channel in the fluid separator plate, and
    discharging the at least a portion of the fluid from the vessel through the fluid discharge valve and the fluid discharge line.

12. The method of claim 11, further comprising the step of discharging the at least a portion of the fluid from the vessel to the fluid input nozzle.

13. The method of claim 11, further comprising the step of discharging the at least a portion of the fluid from the vessel to the fluid containment tank.

14. The method of claim 11, wherein the fluid separator plate is conical.

15. The method of claim 11, wherein the lignocellulosic material is pulled or pushed through the vessel over a stationary fluid separation plate.

16. The method of claim 11, further comprising passing fluid through the through the perforated conveyor into the fluid containment area below the fluid separator plate.

17. The method of claim 11, further comprising one or both of the following steps—i) auguring lignocellulosic material in the material containment area by operation of an auger wherein the auger is positioned above the conveyor proximate to the separator plate; and ii) compressing lignocellulosic material placed in the material containment area with a plunger operational within the material containment area of the vessel.

\* \* \* \* \*